United States Patent [19]

Scholl et al.

[11] 4,059,466
[45] Nov. 22, 1977

[54] HOT MELT THERMOPLASTIC ADHESIVE FOAM SYSTEM

[75] Inventors: Charles H. Scholl, Vermilion; John R. Janner, Jr., Lorain; William C. Stumphauzer, Elyria; Duane O. Shuster, Avon Lake, all of Ohio

[73] Assignee: Nordson Corporation, Amherst, Ohio

[21] Appl. No.: 710,378

[22] Filed: Aug. 2, 1976

[51] Int. Cl.² .............................................. B32B 5/18
[52] U.S. Cl. ...................................... 156/78; 156/500; 156/578; 222/146 HE; 222/251; 261/28; 261/DIG. 26; 264/54; 264/321; 425/4 C; 428/310
[58] Field of Search ........................... 264/50, 54, 321; 261/DIG. 26, 28, 84, 93; 259/95; 222/146 HE, 251; 156/78, 79, 286, 500, 578; 425/4 C; 428/310, 158; 219/10, 65

[56] References Cited

U.S. PATENT DOCUMENTS

| | | | |
|---|---|---|---|
| 3,662,927 | 5/1972 | Cocks | 222/146 HE |
| 3,758,001 | 9/1973 | Callan | 222/146 HE |
| 3,855,378 | 12/1974 | Topcik | 264/54 |
| 3,891,362 | 6/1975 | DeVita | 264/50 |
| 3,945,535 | 3/1976 | Leiste et al. | 222/146 HE |
| 3,959,049 | 5/1976 | Tanaka et al. | 156/79 |
| 3,962,387 | 6/1976 | Hendry | 264/50 |
| 3,975,473 | 8/1976 | Mulvaney | 264/50 |

Primary Examiner—Edward G. Whitby
Attorney, Agent, or Firm—Wood, Herron & Evans

[57] ABSTRACT

A novel method and apparatus are disclosed for manufacturing a novel adhesive product. The product is a pair of substrates adhered together by compressed hot melt adhesive foam. The foam is created by first mixing a chemical blowing agent, such as powdered azodicarbonamide, into the solid hot melt adhesive at a temperature below the decomposition temperature of the blowing agent. Subsequently, the solid adhesive and powdered blowing agent are heated to a temperature above the melting temperature of the solid adhesive and above the decomposition temperature of the blowing agent while confining the molten mixture under pressure in order to force the gas generated by the decomposition of the blowing agent into solution with the liquid adhesive. The liquid adhesive is subsequently dispensed at atmospheric pressure with the result that the gas is released from the solution and becomes entrapped in the adhesive to form a homogenous closed cellular adhesive foam.

14 Claims, 10 Drawing Figures

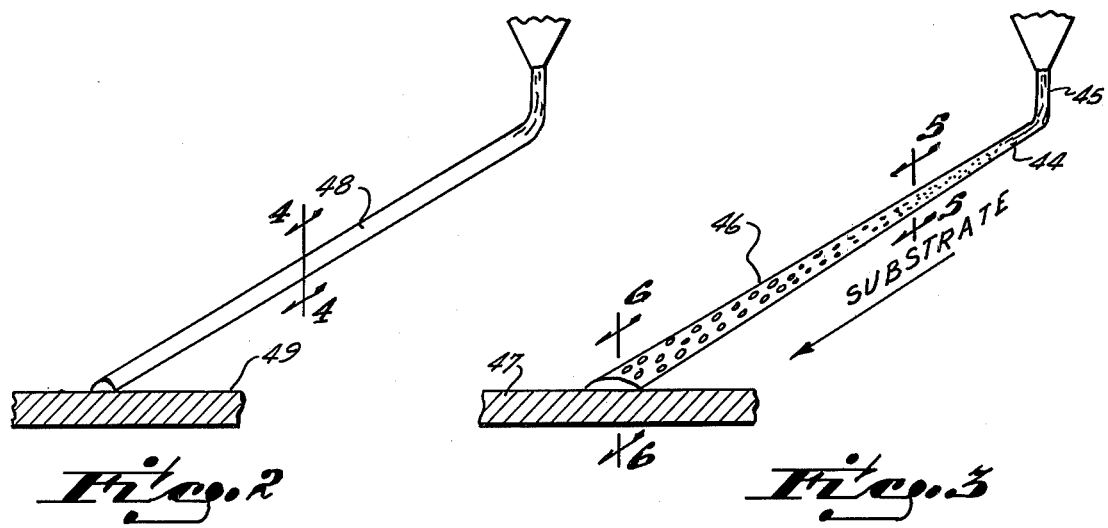
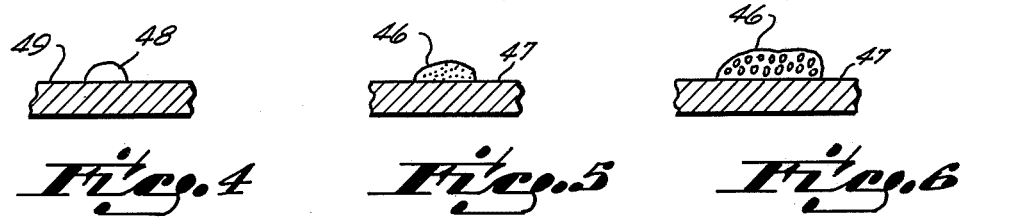
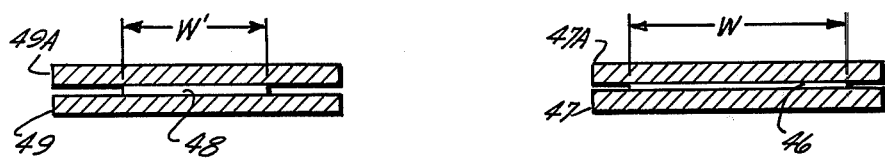
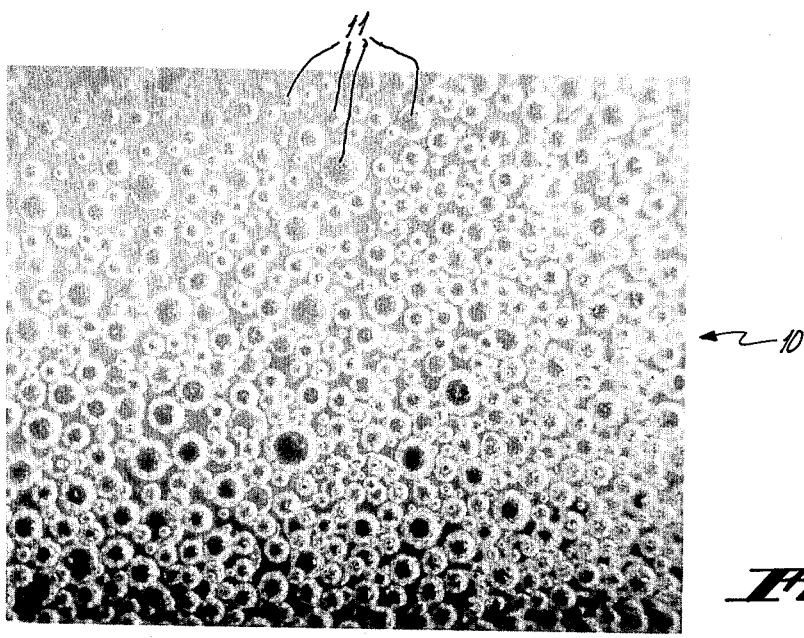

HOT MELT THERMOPLASTIC ADHESIVE FOAM SYSTEM

Hot melt thermoplastic adhesives or so-called "hot melts" are widely used throughout industry for adhering many different diverse products. One of the most common applications of such adhesives is for packaging and cartoning where the quick setting time of this type of adhesive is particularly advantageous.

One of the most common problems with hot melt adhesives is that of compressing the adhesive after application so as to obtain sufficient surface contact between the adhesive and adhered substrate to achieve a good bond. The relatively high viscosity, high surface tension, and quick setting time of hot melt adhesives all combine to prevent the adhesive from spreading over a large surface area when the adhesive is applied as a liquid to the substrate. Instead of spreading, the liquid sets up as a thick bead on the structure. Even when quickly compressed, as for example, between two flaps of a carton, the adhesive is difficult to spread. Generally, when two adhered surfaces are pulled apart, it is found that the bond breaks in the adhesive to substrate interface. Consequently, the greater the area of interface or surface contact, the greater is the strength of the bond.

We have discovered, and one aspect of this invention is predicated upon the discovery that the adhesive strength of a bond achieved with a given quantity of a selected hot melt adhesive may be appreciably improved and in most instances at least doubled if the adhesive is applied as a cellular foam rather than as a conventional non-foamed adhesive.

The increased bonding strength of the foamed adhesive, at least in part, results from the fact that the foamed adhesives may be spread over at least twice the area as the same adhesive in the non-foamed state under the same compressive conditions. Since the strength of the bond is a function of the area covered by the bond, this foaming of the adhesive results in a given quantity of adhesive generating approximately twice as strong a bond as the same adhesive unfoamed.

This greater spreadability of foamed as opposed to un-foamed hot melt adhesive is attributable to several physical characteristics of the foam. Specifically, conventional molten hot melt adhesive is very viscous and is analogous to molten glass which requires substantial energy input to cause flow. In contrast, foamed hot melt adhesive is less viscous and requires much less energy to effect flow. In other words, a greater volume of foamed hot melt adhesive in its molten state may be moved or flattened by a given force per unit of time than may be moved or flattened by the same force acting upon the same molten adhesive in an un-foamed state. Additionally, molten adhesives are incompressible while foamed molten adhesives are compressible because of the presence of gas bubbles contained in the foamed adhesive. Furthermore, the gas bubbles in the foamed molten adhesive have a tendency to lower the viscosity and density of the adhesive as well as making the adhesive readily compressible.

Foamed hot melt adhesive has also been found to have other important advantages over the same adhesive applied and used in the unfoamed state. Specifically, it has been found to have a longer "open" time during which it retains its bonding strength after being dispensed onto a substrate. It has also been found to set up and adhere faster when compressed between two substrates, as for example two flaps of a carton. These two characteristics together are very desirable in cartoning applications because they eliminate the need to instantly close flaps after application of the adhesive and also permit the adhered surfaces to be released from clamping pressure soon after application of that pressure. Together these two characteristics permit greater manufacturing tolerances and consequently expand the range of application of hot melt adhesives.

The longer "open" time of the foamed adhesive over the same unfoamed adhesive results from the small air or gas containing cells of the foam acting as insulative barriers to prevent the escape of heat and consequent solidification of the liquid adhesive. When the foamed adhesive is subsequently spread between the adhered surfaces by the application of clamping pressure it spreads over approximately twice the area of the unfoamed adhesive with the result that the greater surface contact causes the foamed adhesive to then give up its heat faster than the unfoamed adhesive.

Another important aspect of this invention resides in the method of manufacturing the hot melt adhesive foam. We have found that if air or a gas such as nitrogen is thoroughly mixed with a liquid hot melt adhesive and is then forced into solution with the liquid adhesive by high pressure, as for example 300 pounds per square inch, the gas goes into solution with the adhesive. When the adhesive/gas solution is subsequently dispensed from a conventional valved type of adhesive dispenser the gas comes out of solution and becomes entrapped in the adhesive to form a closed cell solid adhesive foam having the desirable adhesive characteristics described hereinabove.

In one preferred embodiment of the invention, the solid mixture of hot melt thermoplastic adhesive and blowing agent is heated and melted in a heated reservoir at a temperature above the melting temperature of the adhesive but below the decomposition temperature of the blowing agent. The molten adhesive and solid blowing agent mixture is then pressurized by a geared pump and supplied under pressure, as for example 300 pounds per square inch, to a hot melt dispenser. Between the pump and the outlet of the hot melt dispenser, the molten adhesive and solid blowing agent mixture is further heated to a higher temperature at which the blowing agent decomposes and evolves a gas, as for example nitrogen, which at that pressure goes into solution with the liquid adhesive. The pressurized liquid/gas adhesive solution is then supplied to a valved type of outlet at the adhesive dispenser from which the adhesive is dispensed at atmospheric pressure. Upon emerging from the outlet nozzle of the dispenser, the gas evolves from the solution in the form of small bubbles causing the adhesive to expand volumetrically. The resultant adhesive in an uncompressed state sets up as a homogenous solid foam having closed air or gas cells substantially evenly distributed throughout the adhesive.

Heretofore large bubbles have often accidently been generated in thermoplastic adhesive but these large bubbles were not in solution in the adhesive and did not result in uniform foamed adhesive. Rather, those large bubbles simply became large randomly spaced voids in the adhesive accompanied by small amounts of foamed adhesive in separate droplets as opposed to the small, regularly spaced cells or pockets generated throughout a continuous extrusion in the adhesive by the invention of this application. In general, in the past whenever large air bubbles appeared in the adhesive, it was the result either of the liquid reservoir running dry of adhesive, cavitating the pump, or of water getting into the adhesive and forming steam pockets. Whenever those conditions occurred, the system would sputter and spit adhesive from the outlet nozzle and create a very uneven deposit of adhesive material on the substrate. As soon as possible after appearance of this condition, every effort was made to remedy it by eliminating the sputtering and bubbles.

The invention of this application is predicated upon the deliberate creation of small regularly spaced air or gas pockets throughout the hot melt adhesive as opposed to the undesirable large and randomly spaced bubbles often inadvertently and accidentally created by poor melting and dispensing practices.

The invention of this application is applicable to very nearly any hot melt adhesive application but it is particularly well suited to cartoning and packaging applications in which it has heretofore been difficult, because of limited available compressive forces, to achieve good wetting of large substrate surfaces by the adhesive. This invention will in most of those applications result in at least a 50% reduction in the total quantity of adhesive required to effect the same or a better bond and without any appreciable additional material cost since the gas or air used for forming the foam is available at little or no cost.

In utilizing the foamed adhesive of the present invention, the surface area necessary for achieving an acceptable bond with a substrate(s) requires a smaller mass of foamed molten adhesive than with the same kind of non-foamed molten adhesive.

The utility of this invention is realized by a reduction in weight of applied ahesive, which means less consumption of adhesives and less cost to the manufacturer.

These and other advantages of the invention will be more apparent from the following detailed description taken in conjunction with the drawings in which:

FIG. 2 is a perspective view of an adhesive dispenser nozzle illustrating the form of a bead of unfoamed adhesive dispensed from the nozzle.

FIG. 3 is a view similar to FIG. 2 but illustrating the configuration of a foamed adhesive bead produced in accordance with the practice of the invention of this application.

FIG. 4 is a cross-sectional view taken on line 4—4 of FIG. 2.

FIG. 5 is a cross-sectional view taken on line 5—5 of FIG. 3.

FIG. 6 is a cross-sectional view taken on line 6—6 of FIG. 3.

FIG. 7 is a cross-sectional view of a pair of substrates between which a non-foamed bead of adhesive is compressed.

FIG. 8 is a view similar to FIG. 7 but illustrating the greater degree of compression effected by the same force on the same adhesive as pictured in FIG. 7 but with the adhesive in a foamed condition.

FIG. 9 is a photograph magnified 20 times of a cross section through an adhesive foam made in accordance with the practice of this invention.

The invention of this application resides in a novel hot melt thermoplastic adhesive foam, the method by which the foam is made, and the apparatus for practicing that method to generate the foam. With reference to FIG. 9 there is shown in photographic form a hot melt thermoplastic adhesive foam 10 made in accordance with the practice of this invention. This foam 10 was made from a conventional hot melt adhesive, Eastabond A-3 adhesive, a polyethylene base material manufactured by Eastman Chemical Company of Rochester, New York. Regularly spaced throughout the foam 10 are closed air cells 11 created by entrappment of air bubbles evolved from a solution of gas in the liquid molten adhesive. These cells 11 are formed after the liquid adhesive/air solution is dispensed from a conventional high pressure hot melt adhesive dispenser 12 (FIG. 1A). As may be seen in FIG. 9, the air cells 11 are relatively evenly spaced throughout the foam and are of substantially the same size throughout. In the illustrated embodiment, the air cells vary from 0.1 millimeters to 0.7 millimeters in diameter. In other practices of the invention, satisfactory hot melt foam adhesives have been created having cells as small as 0.1 millimeters in diameter regularly spaced throughout the adhesive or as large as 0.7 millimeters in diameter. The size of the air cells in the foam is not critical so long as the foam is homogenous and has air cells regularly distributed throughout. Of course, the cells cannot be so large that when the foam is subsequently compressed between two substrates, as illustrated in FIG. 8, the cells break and create voids so thick as to extend completely through the compressed adhesive.

Figure 1:
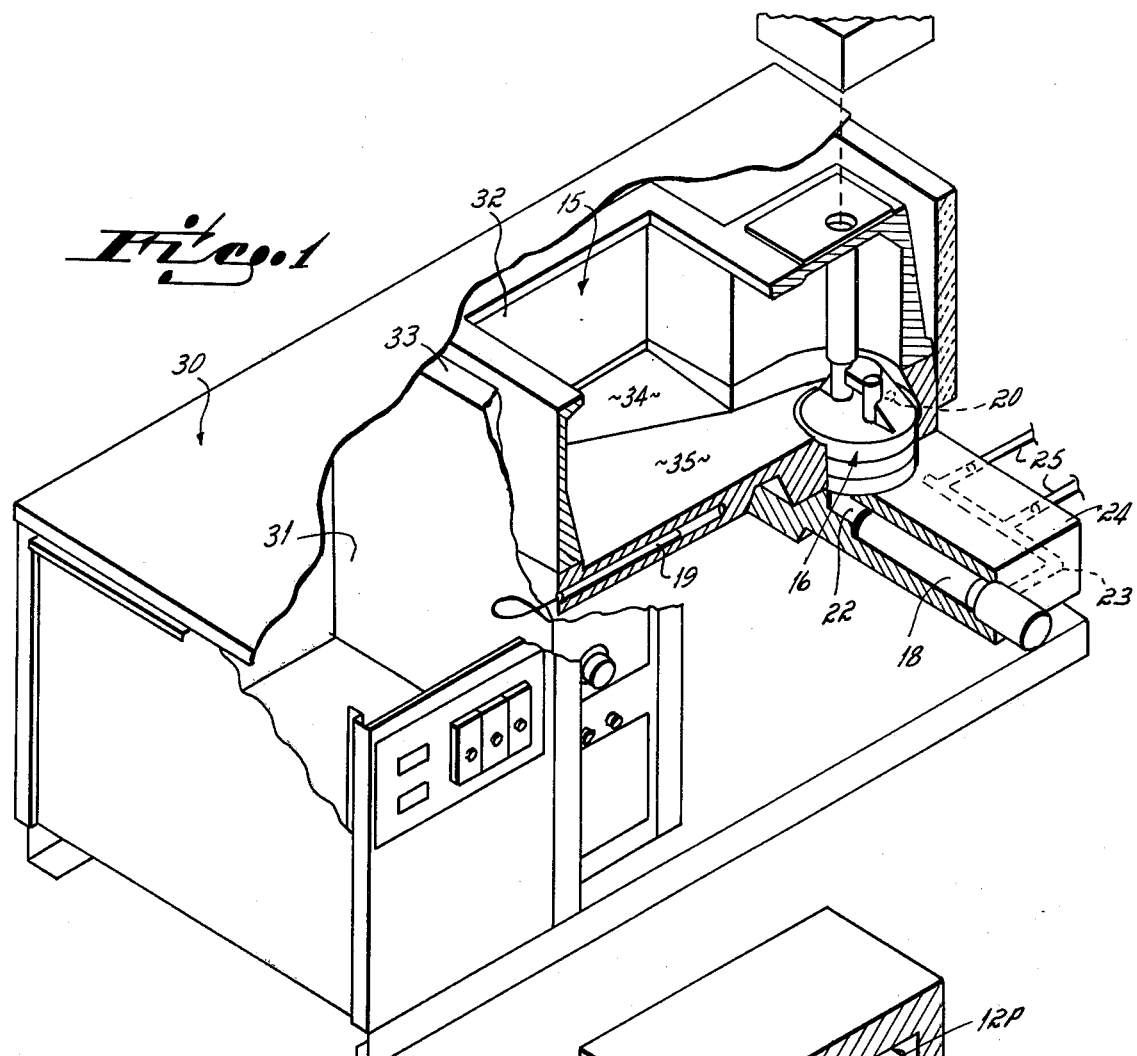
FIG. 1 is a perspective view, partially broken away, of a hot melt application system useful in the practice of the invention of this application.
Figure 1A:
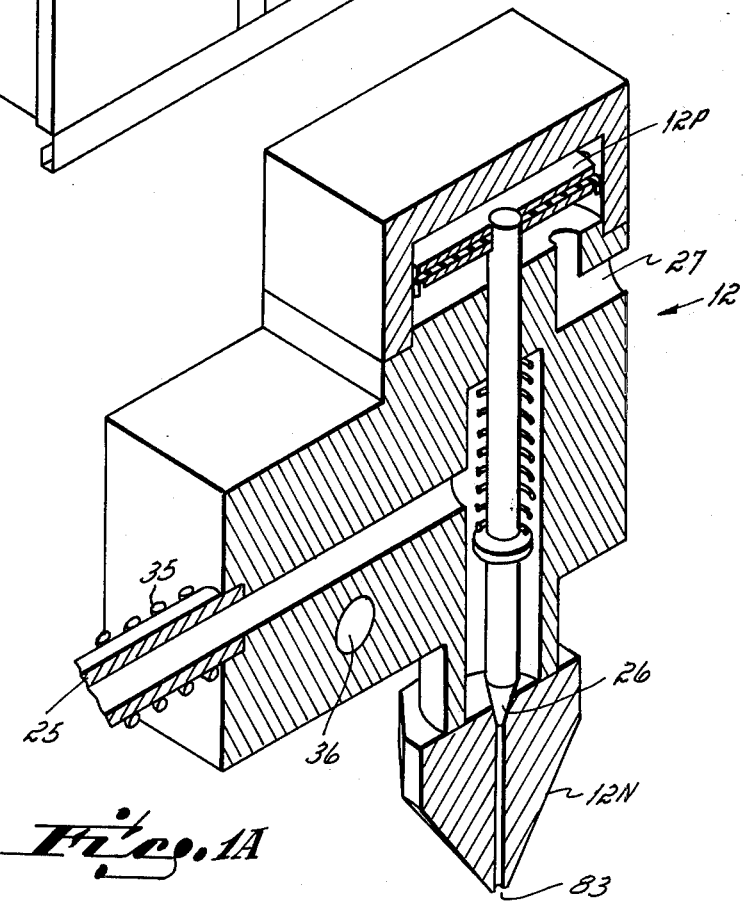
FIG. 1A is a partially diagrammatic perspective view of the dispensing gun portion of the system illustrated in FIG. 1.

Referring now to FIG. 1 there is illustrated one preferred embodiment of apparatus used in the practice of this invention. In general, this apparatus comprises a melting bank 15, a gear pump 16, a filter 18, and the dispenser 12. In practice, a mixture of 100 parts by weight of solid hot melt thermoplastic adhesive and one part of powdered blowing agent are placed in the reservoir 15 and there the solid hot melt adhesive is melted by heaters 19 contained in the bottom wall of the reservoir. The adhesive and blowing agent are so chosen that the blowing agent is not decomposed or otherwise caused to evolve gas at the melting temperature of the adhesive. The mixture of molten themoplastic adhesive and solid powdered blowing agent then flows by gravity to the inlet 20 of the pump 16. The molten adhesive and blowing agent mixture flow through the inlet 20 into the interior of the gear pump 16 where the meshing teeth of a pair of gears (not shown) cause the mixture to be pressurized to a high pressure, as for example 300 pounds per square inch, and pumped under that pressure from the outlet of the pump through conduit 22, the filter 18, into outlet conduits 23 of a manifold block 24 and through heated conduits 25 to the dispensing gun 12. The conduit 25 is a conventional heated hose or conduit heated by an electrical resistance heater 35. Similarly, the dispenser 12 is a conventional heated gun or dispenser having a thermostat controlled electrical resistance heater 36 mounted within the gun. The heaters 35, 36 are operative to heat the molten adhesive/blowing agent mixture to the application temperature of the adhesive, which temperature is above the decomposition temperature of the blowing agent such that the blowing agent decomposes and evolves gas, as for example nitrogen, into the molten adhesive between the pump outlet and the dispenser outlet 83. At the pressure maintained by the pump 16, 300 pounds per square inch in one preferred embodiment, the gas evolved from the blowing agent is forced into solution with the molten adhesive and is maintained in solution with the molten adhesive until dispensed from the gun 12.

In the illustrated embodiment, the gun 12 contains a pneumatically operated piston 12P attached to a flow control valve 26. When air pressure is supplied through an inlet line 27 of the gun, it causes the piston 12P to push upwardly against a spring and thereby opens the valve 26 so as to allow molten adhesive/gas solution under approximately 300 pounds per square inch pressure to flow from the gun. The molten adhesive/gas solution emerges as a thin clear liquid stream which quickly expands as tiny gas bubbles appear. These bubbles first become visible and the solution first takes on the appearance of a foam approximately one-half inch from the nozzle outlet. The tiny gas bubbles enlarge and become entrapped within the molten adhesive as it solidifies and thereby form a foam having the cellular structure depicted in FIG. 9.

The heated reservoir 15 and pump 16 dispensing apparatus 12 are contained within a sheet metal housing 30. This housing is divided into two sections, a control section 31 and a reservoir section 32. The two sections are separated by a heat insulated barrier 33 which protects the electrical apparatus contained within the control section 31 from the heat generated by the reservoir 15. Within the control section are the usual temperature control thermostats as well as the temperature setting and measuring gauges.

The reservoir 15 is a conventional open top melting pot having bottom walls 34, 35 which slope downwardly toward the inlet opening 20 of the pump 16. The bottom walls of the reservoir contain the heaters 19 which are generally operative to heat the solid thermoplastic material to a temperature slightly in excess of its melting temperature. That temperature is usually on the order of 175° F. to 350° F. for most hot melt adhesives.

The gear pump 16 is completely described in U.S. Pat. No. 3,964,645, which patent is assigned to the assignee of this application. It includes a pair of intermeshing gears, the teeth of which operate as multiple small pistons to pull incoming liquid into the pump, pressurize it, and dispense it from the pump outlet.

In one preferred practice of the invention of this application Eastabond A-3 manufactured by Eastabond Chemical Company of Rochester, New York is employed as the hot melt adhesive. One hundred parts by weight of this adhesive in solid pelletized form is mixed with one part by weight of "Celogen AZ", a commercially available blowing agent manufactured by Uniroyal Chemical Division of Uniroyal, Inc. "Eastabond A-3" has a melting temperature between 180° F. and 200° F. and an application temperature of approximately 375° F. "Celogen AZ" decomposes and evolves nitrogen gas in the temperature range of 356° F. and 410° F. The two materials, powdered "Celogen AZ" and pelletized "Eastabond A-3" are mixed in the ratio set forth above while in the solid state. The mixed solid materials are placed in the reservoir 15 here the mixture is heated to a temperature of approximately 250° F. At this temperature the hot melt thermoplastic adhesive material melts and forms a pool or reservoir of molten adhesive and solid blowing agent within the reservoir 15. This pool or reservoir flows downwardly over the downwardly sloping bottom walls 34, 35 of the reservoir to the inlet port 20 of the gear pump 16. The pump 16 is operative to force the molten adhesive solid blowing agent mixture through the pump outlet into the fluid flow conduit 22. Within the conduit 22, the molten adhesive/solid blowing agent mixture is at a relatively high pressure, on the order of 300 pounds per square inch, which pressure is maintained until the adhesive is dispensed from the nozzle 12N of the dispenser. From the conduit 22 the molten adhesive/blowing agent mixture flows through the filter 18 and conduits 23 to the heated hoses 25 and subsequently to the dispensing gun 12. In the course of passing through the hose 25, the mixture is further heated to the adhesive application temperature of approximately 375° F. When the mixture reaches the temperature of 356° F. decomposition of the blow agent commences and nitrogen gas evolves from the mixture. At the pressure of the mixture within the conduit 25, the nitrogen immediately goes into solution with the molten adhesive. The molten adhesive/nitrogen gas solution remains as a solution until it is dispensed from the gun 12. Upon opening of the valve 26 of the gun the liquid/gas solution emerges as a clear transparent solution. Before the solution has passed very far from the nozzle, and in one preferred embodiment approximately ½ inch, the solution foams as tiny gas bubbles or cells form in the liquid and convert the liquid to a white foamy appearance. This condition is illustrated in FIG. 3 where the interface 44 of the clear liquid 45 and white foam 46 is illustrated as being located above the point of contact of the adhesive stream with the substrate 47. The cells or bubbles continue to increase in number and size as the stream moves further from the nozzle. Even after the bead of foamd adhesive 46 is deposited on the substrate, it continues to grow in width and height for a substantial period of time, as for example 1 minute after it contacts the substrate 47. This growth is depicted in FIGS. 5 and 6.

We have found and one important characteristic of the foamed adhesive created by the practice of this invention is that it retains its heat and retains its "open" time (during which it retains its adhesive characteristic) for a substantially longer time than does a bead 48 (FIG. 2) of the identical adhesive dispensed under the same identical conditions except for the absence of the air or gas cells in the liquid. This long "open" time enables the foamed adhesive to be "closed" and adhered to a substrate for a much longer period of time than the same adhesive dispensed in an unfoamed condition. Additionally, as illustrated in FIGS. 7 and 8, when the foamed "open" adhesive is compressed between two substrates 47, 47A, a substantial portion of the gas is forced from the foam and the adhesive spreads to a width W of approximately twice the width W' of a bead of the same adhesive dispensed from the same nozzle in a non-solvated gas condition and then subjected to the same compressive force between two substrates 49, 49A. This additional compressibility of the foamed adhesive as compared to the same adhesive in an unfoamed condition is particularly desirable in application, as for example packaging and cartoning applications, where only a limited pressure can be placed upon the substrates, such as occurs when flaps of paperboard or corrugated cartons are adhered together. In many such applications, the greater compressibility of the foamed adhesive which may be compressed to a thickness of as little as 0.009 in. under a pressure of 4 pounds per square inch, enables approximately one-half the total quantity of adhesive to effect the same or a better bond between two substrates than is achieved with the same quantity of adhesive in the unfoamed condition.

Throughout this specification and claims the term "solution" has been used to describe the liquid adhesive/gas dispersion supplied under high pressure to the gun, which dispersion when dispensed from the gun at atmospheric pressure cools and creates a foamed adhesive. The applicants are of the view that this mixture is a true solution in which the molecules of the dissolved gas are dispersed among those of the liquid adhesive. The term though as used in the specification and the claims of the application is intended to define and encompass the broader generic definition of solution which is a gas homogeneously mixed with the molten liquid adhesive, whether or not the molecules of the dissolved gas are in fact dispersed among those of the solvent.

The primary advantage of this invention is that it enables a foamed hot melt adhesive to be inexpensively created without the use of any expensive gases or without the use of any expensive machinery. The gas utilized in the creation of the foam is usually nitrogen which is relatively inexpensive. Any other gas though which is inert in the presence of the liquid adhesive is equally applicable to the practice of this invention.

The equipment utilized in the practice of this invention is inexpensive and is for the most part, equipment which is conventionally used in the melting and dispensing of hot melt adhesives. Consequently, there is very little additional equipment cost involved in the practice of the invention of this application.

The primary advantage though of the invention of this application is in the resulting adhesive product. When compressed between two substrates, the adhesive foam created by this invention has greater surface interface area with the substrates than the same adhesive in the unfoamed state. It also has increased "open" time as opposed to the same adhesive applied in the unfoamed state. These features enable the adhesive cost for many applications to be reduced by at least 50% without any sacrifice in the bonding strength of the adhered surfaces.

Another advantage of this invention derives from the thixotropic property of foamed adhesive. Unfoamed adhesive when applied to a vertical surface tends to run down that surface in the manner of a drop of water applied to a vertical substrate. In the course of running down the vertical surface the unfomed material forms a thin film at the top and a film of increasing thickness toward the bottom of the running stream or droplet. Because of the variation of thickness fo the material, it has a variable open time which often results in a bond of varying quality. Foamed adhesive on the other hand, because of its greater thixotropic property, is not so prone to run or sag on a vertical surface and therefore forms a bond of even or consistent quality upon such a surface.

Throughout this specification and the following claims we have used the phrase "hot melt thermoplastic adhesive". We intend that this phrase shall mean and be limited to a solvent free adhesive which is applied in a molten state and forms a bond upon cooling to a solid state.

While we have described several different embodiments of the invention, those persons skilled in the arts to which it pertains will appreciate other changes and modifications which may be made without departing from the spirit of our invention. Therefore, we do not intend to be limited except by the scope of the following appended claims:

We claim:
1. The method of bonding with a hot melt thermoplastic adhesive foam which comprises,
   heating solid thermoplastic adhesive and a blowing agent so as to create a gaseous containing hot melt adhesive in a liquid state,
   pressurizing the mixture of liquid and gas so as to force the gas into solution with the liquid adhesive,
   dispensing the liquid and gas solution at a pressure less than the solution maintenance pressure of said gas and adhesive solution whereby said gas is released from solution and forms a hot adhesive foam, and
   compressing said hot adhesive foam between two substrates to force gas from the foam and to form a bond between said substrates.
2. The method of claim 1 in which said gaseous containing liquid adhesive is placed under a pressure of at least 90 pounds per square inch to force said gas into solution.
3. The method of claim 1 in which said gaseous containing liquid adhesive is placed under a pressure of approximately 300 pounds per square inch to force said gas into solution.
4. The method of claim 1 in which said liquid and gas solution is dispensed at atmospheric pressure.
5. The method of bonding with a hot melt thermoplastic adhesive foam which comprises
   heating a mixture of solid thermoplastic adhesive and blowing agent to convert the adhesive to a liquid state,
   pressurizing the mixture while further heating it so as to cause gas to be evolved from the blowing agent and forced into solution with the liquid adhesive,
   dispensing the liquid and gas solution at atmospheric pressure whereby said gas is released from solution and forms a hot adhesive foam,
   compressing said hot melt adhesive foam between two substrates to force gas from the foam, and
   cooling the compressed adhesive to form upon solidification a bond between said substrates.
6. The method of claim 5 in which said mixture is placed under a pressure of at least 90 pounds per square inch to force said gas into solution.
7. The method of claim 5 in which said mixture is placed under a pressure of approximately 300 pounds per square inch to force said gas into solution.
8. Apparatus for manufacturing a hot melt thermoplastic adhesive foam comprising
   first heating means for heating a mixture of solid thermoplastic adhesive and blowing agent to convert said solid adhesive to a liquid state,
   means for pressurizing said liquid adhesive and blowing agent, second heating means for further heating said pressurized liquid adhesive and blowing agent to a temperature operative to cause said blowing agent to decompose and evolve gas, said gas being force into solution with the liquid adhesive, and
   means for dispensing the liquid and gas solution at a pressure below the solution maintenance pressure of said gas and adhesive solution whereby said gas is released from solution as said liquid cools and forms a solid adhesive foam.
9. The apparatus of claim 8 in which said pressurizing means comprises a gear pump.
10. The apparatus of claim 8 in which said first heating means comprises a heated reservoir for receiving and melting solid thermoplastic adhesive.

11. The apparatus of claim 8 in which said dispensing means comprises a dispensing gun hving an outlet nozzle and a selectively openable valve for controlling flow from said gun.

12. The apparatus of claim 11 in which said second heating means includes a heater located at said dispensing gun.

13. The method of bonding with a hot melt thermoplastic adhesive having an extended open time in a foamed uncompressed state and a short set time in a foamed compressed state, which method comprises:

heating a mixture of solid thermoplastic adhesive and blowing agent to convert the adhesive to a liquid state and to cause said blowing agent to evolve a gas, pressurizing the liquid adhesive and gas so as to force the gas into solution with the liquid adhesive, dispensing the liquid and gas solution at atmospheric pressure onto a substrate such that the dissolved gas comes out of solution and forms a hot cellular foam adhesive of extended open time, compressing the hot cellular foam adhesive between said substrate and a second substrate such that a substantial portion of the gas entrapped in said foam is released to atmosphere and the set time of the adhesive foam is substantially reduced by said compression, and cooling the compressed adhesive to form upon solidification a bond between said substrates.

14. The method of claim 13 in which a compressive pressure of four pounds per square inch upon said adhesive foam is operative to reduce the adhesive to a thin film of approximately 0.009 inch thickness disposed between the substrates.

* * * * *